United States Patent [19]
Marquardt

[11] Patent Number: 4,746,239
[45] Date of Patent: May 24, 1988

[54] SUPPORT STRUCTURE WHICH CAN BE PUT TOGETHER FROM SHEET METAL PARTS

[75] Inventor: Ulrich Marquardt, Berlin, Fed. Rep. of Germany

[73] Assignee: Siemens Aktiengesellschaft, Munich, Fed. Rep. of Germany

[21] Appl. No.: 924,696

[22] Filed: Oct. 29, 1986

[30] Foreign Application Priority Data

Nov. 11, 1985 [DE] Fed. Rep. of Germany ....... 3540329

[51] Int. Cl.$^4$ ............................ B25G 3/00; F16D 1/00
[52] U.S. Cl. .................................... 403/24; 403/408.1; 312/257 SK
[58] Field of Search ...................... 403/408.1, 388, 24; 301/9 DN; 411/366; 312/257 SK

[56] References Cited

U.S. PATENT DOCUMENTS

| | | | |
|---|---|---|---|
| 2,195,589 | 4/1940 | Eksergian | 301/9 DN X |
| 3,145,362 | 8/1964 | Kleven | 411/366 X |
| 4,040,694 | 8/1977 | Lascarrou | 403/408.1 X |

FOREIGN PATENT DOCUMENTS

| | | | |
|---|---|---|---|
| 1072619 | 2/1980 | Canada | 403/408 |
| 2556137 | 2/1979 | Fed. Rep. of Germany . | |
| 351267 | 6/1931 | United Kingdom . | |
| 2170190 | 9/1981 | United Kingdom . | |

OTHER PUBLICATIONS

Product Engineering, May 25, 1959, pp. 62–63.

Primary Examiner—Andrew V. Kundrat
Attorney, Agent, or Firm—Kenyon & Kenyon

[57] ABSTRACT

The parts of a support structure which can be assembled together have rimmed holes and openings going through them centrally. A conical nut is screwed onto a countersunk screw which goes through the openings, and the nut has a conical surface which has a cone angle that is the same as the inner conical surface of the opening of a corresponding rimmed hole. The described screw connection is particularly well suited for support structures which are heavily stressed by shocks, vibrations or other disturbances and is found to be durably resistant under these conditions without additional means for securing the screw and nut.

1 Claim, 1 Drawing Sheet

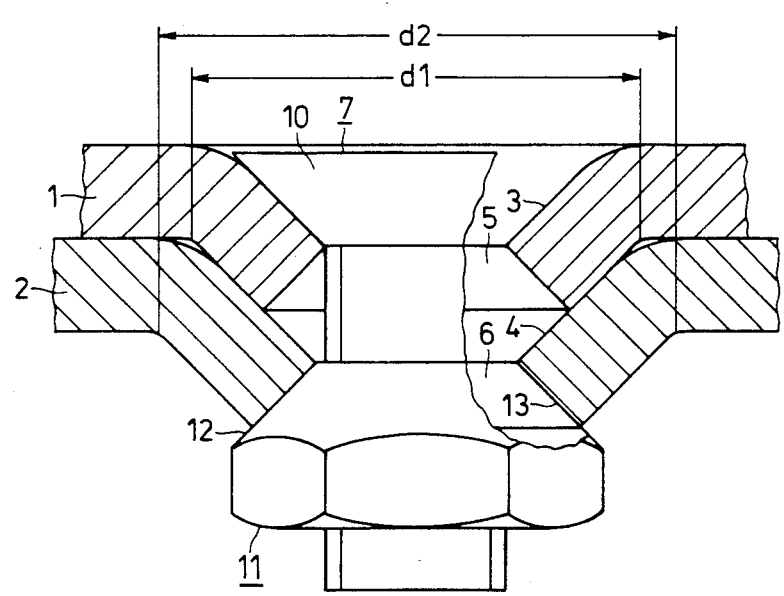
FIG 1
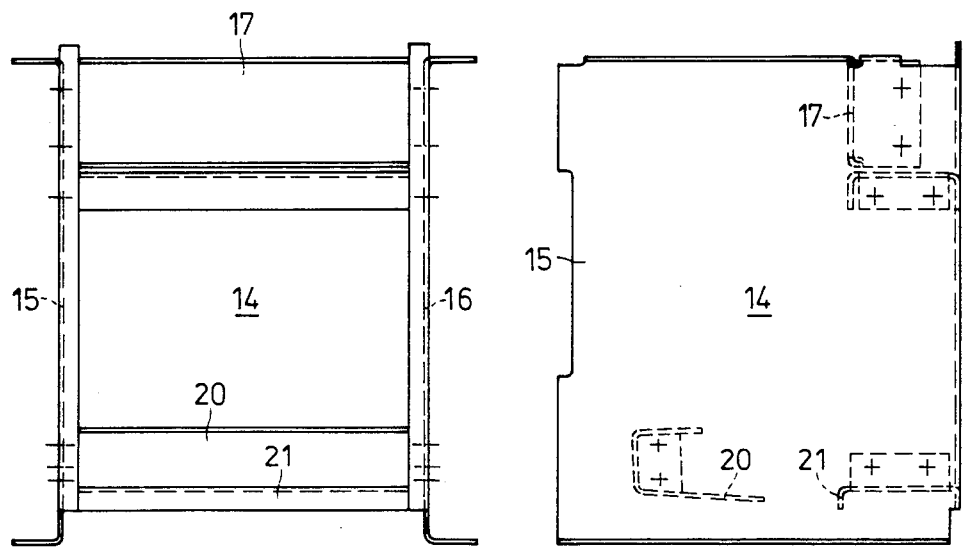
FIG 2
FIG 3

SUPPORT STRUCTURE WHICH CAN BE PUT TOGETHER FROM SHEET METAL PARTS

BACKGROUND OF THE INVENTION

The present invention relates to a support structure assembled from sheet metal parts, the parts of which are provided with funnel-shaped rimmed holes and openings centrally going through these rimmed holes and which can be connected by countersunk screws and nuts.

An arrangement of this type has become known, for instance, from German Patent Application DE-C-No. 25 56 137. One field of application of such support structures are frames or housings in which it is important that the parts can be put together with dimensional accuracy and shear forces can be transmitted among them, the screw connection being stressed only by a normal force. If such connections are applied to support structures which in operation are subjected to heavy vibrations having large acceleration values, it has been found, however, that the screw connections have a tendency to loosen. In this connection, it is known per se to use means for securing the screws, for instance, self-locking nuts or screw-securing varnishes. This, however, requires additional effort and great care is required to ensure the desired effect.

SUMMARY OF THE INVENTION

It is an object of the present invention to design the connecting points of a support structure subjected particularly to shock stresses such that a durable connection of the sheet metal parts is achieved without special means for securing the screws.

The above and other objects of the present invention are achieved by a support structure assembled from sheet metal parts, said parts being provided with funnel-shaped rimmed holes and openings disposed centrally through the rimmed holes, said parts adapted to be connected by countersunk screw and nut means, said nut means comprising a conical nut having a conical surface having an angle the same as an inner conical surface of the opening of a corresponding rimmed hole. It has been found that connections designed in this manner are surprisingly resistant to all vibrations occurring in practice and thereby, the dimensionally accurate fit of the sheet metal parts is ensured over the life of a piece of equipment.

In the known connection design (DE-C-No. 25 56 137), different funnel angles are provided in the sheet metal parts to be connected. In contrast thereto, the funnel angle, according to a further embodiment of the invention, of the parts to be connected can be the same which represents a simplification in the fabrication of the sheet metal parts. The invention offers surprising advantages in the application to low-voltage circuit breakers. If the housing of such a circuit breaker is designed as the support structure, the parts of which form the side walls and cross beams connecting them, a strength and durability are achieved such as was available heretofore only by welding connections or screw connections with a substantially larger cross section.

BRIEF DESCRIPTION OF THE DRAWINGS

The present invention will be explained in greater detail in the following detailed description with the aid of the embodiment shown in the drawings, in which:

FIG. 1 shows the junction point of a support structure on an enlarged scale, as a cross section; and FIGS. 2 and 3 show as an example for a support structure, schematically, the housing of a low-voltage circuit breaker in two orthogonal views.

DETAILED DESCRIPTION

In FIG. 1 are shown enlarged two parts 1 and 2, comprising sheet metal, of a support structure which are provided in the same manner with funnel-shaped rimmed holes for embossings 3 and 4. Both rimmed holes have the same angle so that the parts 1 and 2 in the assembled condition rest against each other also in the region of the rimmed holes without a space therebetween. In a manner known per se, the starting diameter d1 of the rimmed hole 3 of the upper or outer part 1 is smaller than the starting diameter d2 of the rimmed hole 4 of the lower or inner part 2. Central openings 5 and 6 of the rimmed holes 3 and 4 are penetrated by a countersunk screw 7, the head 10 of which terminates flush with the surface of part 1 or is slightly set back relative to the latter. Screwed onto the thread of the countersunk screw 7 is a conical nut 11, the conical surface 12 of which has the same cone angle as the inner conical surface 13 of the opening 6 of the rimmed hole 4. If this screw connection is tightened by the permissible forces, a tightening of the parts 1 and 2 is obtained such that, beyond the provided firm connection of the parts 1 and 2, high security against self-loosening under the influence of vibrations and shocks exists. It is, therefore, not necessary to use special means for securing the screws as is customary otherwise.

The parts 1 and 2 according to FIG. 1 can be components of a support structure which is schematically shown in FIGS. 2 and 3. This involves a housing 14 of a low-voltage circuit breaker for a rated current of 1000 amperes or more. Such a housing is exposed to large forces due to continuous stress by spring accumulators. Furthermore, heavy vibrations with large acceleration values occur during the switching.

Current forces having a frequency depending on the respective line frequency can be superimposed on these forces.

Screw connections according to FIG. 1 are located at the points characterized by the intersecting dashed-dotted lines in FIGS. 2 and 3.

By these screw connections, side walls 15 and 16 are connected to cross beams (17; 20 and 21). The parts shown are only examples for supporting elements of a housing; obviously, also other parts acting in the same sense can be connected to each other in the manner described, for instance, partitions for supporting shafts or for attaching accessories.

The described screw connection can be used logically in the same manner to support structures for other equipment and installations. For insance, cabinets for switching installations or other highly stressed support frames for electric equipment can be designed in this manner.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A support structure assembled from sheet metal parts wherein the sheet metal parts comprise side walls and cross beams connecting the side walls together of a housing of a low-voltage circuit breaker, said sheet metal parts being provided with funnel-shaped rimmed holes each having the same funnel angle and having openings disposed centrally through the rimmed holes, said parts adapted to be connected by a countersunk screw and nut means, said nut means comprising a conical nut having a conical surface having an angle the same as an inner conical surface of the opening of a corresponding rimmed hole, the rimmed holes of the two parts overlying one another in the assembled condition.

* * * * *